(12) United States Patent
Ballet et al.

(10) Patent No.: US 6,955,266 B2
(45) Date of Patent: Oct. 18, 2005

(54) STRAINER

(75) Inventors: Joseph Ballet, Bressolles (FR); Thierry Dujardin, Luzinay (FR); Andre Trigon, La Boisse (FR)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/350,634

(22) Filed: Jan. 24, 2003

(65) Prior Publication Data

US 2004/0144105 A1 Jul. 29, 2004

(51) Int. Cl.$^7$ .............................................. B01D 35/02
(52) U.S. Cl. .................. 210/409; 210/433.1; 210/448; 210/449; 210/452; 210/459; 210/497.3; 210/495
(58) Field of Search ............................ 210/409, 433.1, 210/446, 448, 449, 459, 495, 497.3, 451, 452; 285/112; 165/119

(56) References Cited

U.S. PATENT DOCUMENTS

| | | | | |
|---|---|---|---|---|
| 1,782,531 A | * | 11/1930 | Fokker | 210/407 |
| 1,971,120 A | * | 8/1934 | Hubert et al. | 210/445 |
| 2,658,625 A | * | 11/1953 | Rafferty | 210/445 |
| 2,686,596 A | * | 8/1954 | Storms | 210/289 |
| 2,893,563 A | * | 7/1959 | Bottum | 210/448 |
| 3,351,352 A | * | 11/1967 | Blakeley et al. | 277/615 |
| 3,700,112 A | * | 10/1972 | Maeshiba | 210/445 |
| 4,725,364 A | * | 2/1988 | Hurley et al. | 210/767 |
| 6,592,758 B2 | * | 7/2003 | Quintel | 210/232 |

* cited by examiner

Primary Examiner—Matthew O. Savage
(74) Attorney, Agent, or Firm—Bachman & LaPointe, P.C.

(57) ABSTRACT

A conduit has a first end and interior and exterior surfaces extending downstream from the first end. A strainer has a first end and a second end. An upstream portion of the strainer is positioned engaging a projection on the interior surface of the conduit to resist downstream shifting of the strainer. A strainer body extends at least partially downstream of the upstream portion. The apparatus may be used as a strainer/coupler and may be used to filter water in a chiller apparatus.

17 Claims, 3 Drawing Sheets

STRAINER

BACKGROUND OF THE INVENTION (1) Field of the Invention

This invention relates to fluid handling, and more particularly to the straining of aqueous heat transfer fluids in refrigeration systems.

(2) Description of the Related Art

Industrial refrigeration is a well developed field. Many systems involve transferring heat to or from an aqueous solution, often essentially water. The heat may be exchanged with a refrigerant passing along in a closed-loop refrigeration cycle. In many systems, the cooled fluid is water which may flow in a closed loop (e.g., for building or industrial cooling) or in an open loop (e.g., for consumption). In water-cooled chillers, the heated fluid is also water. It is advantageous to strain the fluid to prevent clogging of or damage to system components.

BRIEF SUMMARY OF THE INVENTION

One aspect of the invention is an apparatus having a conduit and a strainer. The conduit has a first end, interior and exterior surfaces extending downstream from the first end, and a projection on the interior surface. The strainer has a first end and a second end. An upstream portion of the strainer is positioned to engage the conduit projection to resist downstream shifting of the strainer. A strainer body extends at least partially downstream of the upstream portion.

The apparatus may be used as a coupler for connecting first and second fluid conducting members and extending along an axis between the first end and a second end. The exterior surface proximate the conduit first and second ends may be adapted for connection to the first and second fluid conducting members. Such adaptation may comprise first and second recesses at first and second locations relatively close to the first end and to the second end, respectively. The apparatus may further include first and second clamps for respectively securing the conduit to the first and second fluid conducting members. The first recess may be axially aligned with the projection such as being commonly formed by an annular indentation from the exterior.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
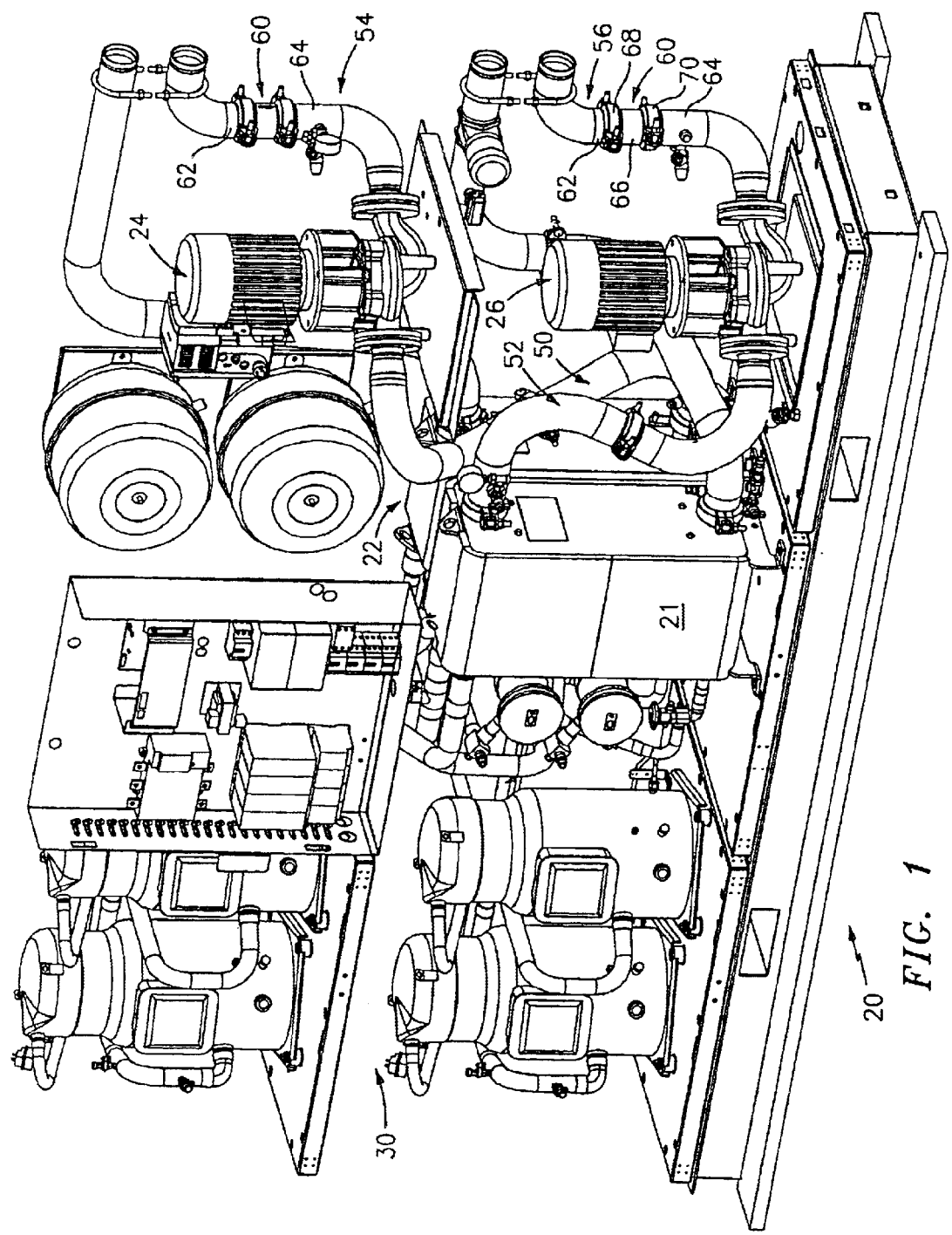
FIG. 1 is a view of a chiller system.

FIG. 1 shows a chiller system 20. The system includes two heat exchangers: an evaporator (cooler) 21; and a condenser 22. A first flow from a condenser pump 24 passes through the condenser 22 and a second flow from a cooler pump 26 passes through the cooler 21.

The exemplary system is a water-cooled system in which a refrigeration subsystem 30 has a refrigerant flow path that transfers heat to the first flow in the condenser and draws heat from the second flow in the evaporator. The condenser and cooler pump 24 and 26 respectively have outlet conduit assemblies 50 and 52 connecting such pumps to the heat exchanger and inlet conduit assemblies 54 and 56 receiving water from an outside condensing water loop and a chilled water loop (building or industrial process return).

In a exemplary use, the evaporator produces chilled water that may be used, for example, for air conditioning a building or cooling an industrial process. The condenser 22 is coupled to an appropriate external heat rejection system (not shown). Exemplary heat rejection systems may be an open loop cooling tower or a closed loop air-cooled liquid cooler.

To protect the pumps from damage and the heat exchanger from clogging, strainers are advantageously provided in both the condenser and cooler flow path loops. In the exemplary embodiment, both inlet conduit assemblies 54 and 56 have an inventive strainer/coupler assembly 60 joining upstream and downstream conduit sections 62 and 64. Each assembly 60 includes a sleeve 66 and upstream and downstream clamps 68 and 70 coupling the sleeve to the upstream and downstream conduits 62 and 64. In the exemplary embodiment, the conduits 62 and 64 and sleeve 66 are formed of steel pipestock with rolled clamp grooves (described below) near their ends.

Figure 2:
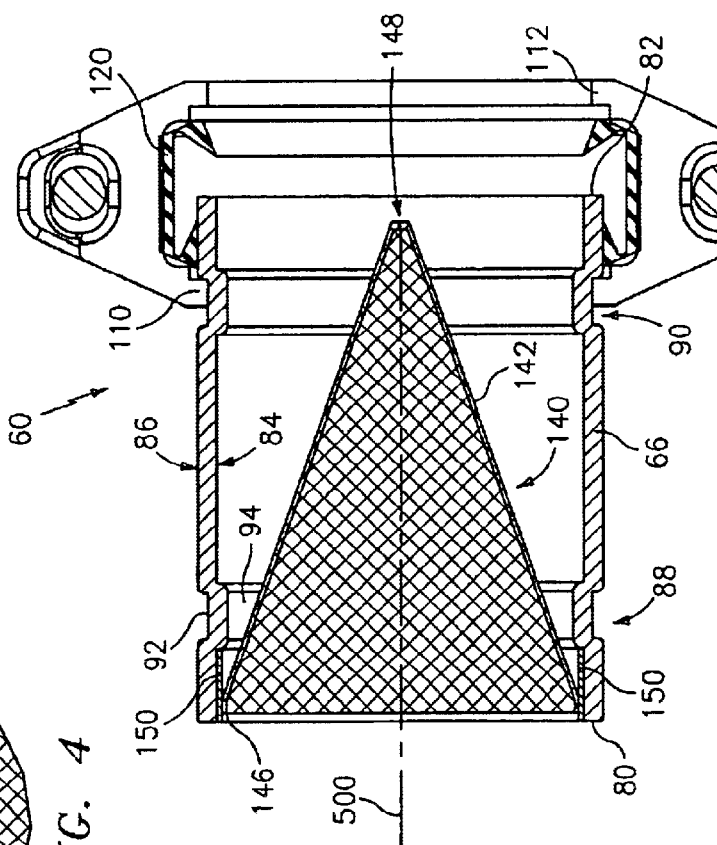
FIG. 2 is a partial longitudinal sectional view of a strainer/coupler assembly of the system of FIG. 1.
Figure 4:
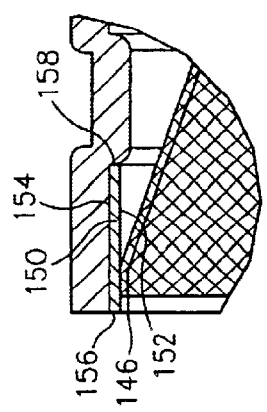
FIG. 4 is a detailed longitudinal sectional view of an upstream end portion the strainer/coupler assembly of FIG. 2.

FIG. 2 shows further details of the strainer/coupler 60. The sleeve 66 extends from an upstream end 80 to a downstream end 82 and has a central longitudinal axis 500. An exemplary sleeve length is 10 cm. The sleeve has inner (interior) and outer (exterior) surfaces 84 and 86. The upstream and downstream rolled clamp grooves 88 and 90 each define an annular recess 92 having a substantially rectangular cross section in the exterior surface and a rib or annular projection 94 in the interior surface opposite the annular recess.

Figure 3:
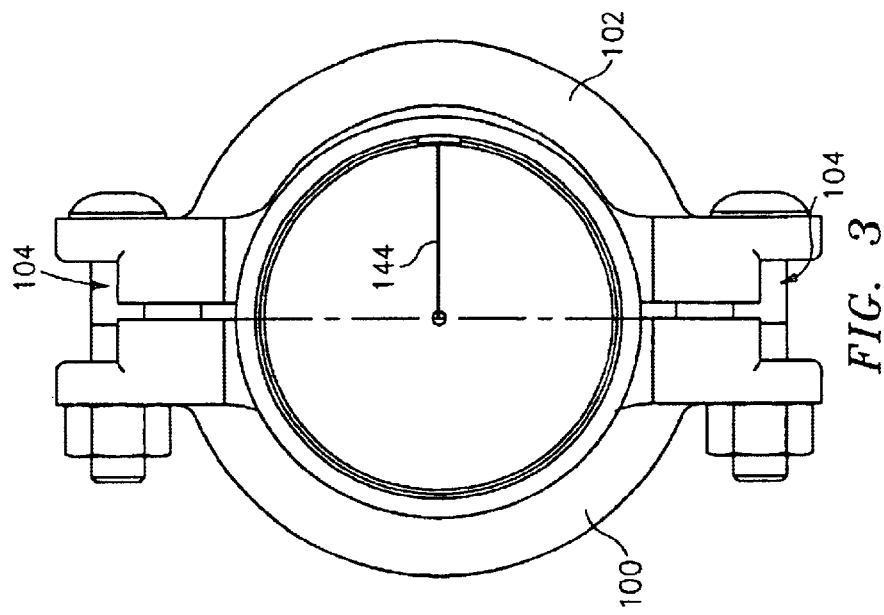
FIG. 3 is an end view of the strainer/coupler assembly of FIG. 2.

Each exemplary clamp 68 and 70 has a split body, the two halves 100 and 102 (FIG. 3) of which are secured to each other via a pair of diametrically opposite threaded bolt/nut assemblies 104. An exemplary clamp body is formed of steel and has a pair of radially inwardly-projecting upstream and downstream lips 110 and 112 (FIG. 2). The upstream lip of the downstream clamp 70 is compressively engaged to the sleeve in the recess 92 of the downstream groove 90. The downstream lip of the downstream clamp 70 is similarly compressively engaged to an upstream recess in the downstream conduit 64 of FIG. 1. Similarly, the downstream lip of the upstream clamp 68 is compressively engaged to the sleeve in the recess of the upstream groove and the upstream lip of the upstream clamp is compressively engaged to a similar recess in the upstream conduit 62 of FIG. 1. Each clamp body carries an elastomeric gasket 120 (FIG. 2) for providing a seal between the sleeve and adjacent the conduit.

The strainer/coupler assembly 60 further includes a strainer 140. The exemplary strainer 140 comprises a foraminate element 142 having an upstream interior and a downstream exterior. The exemplary foraminate member is formed as a wire mesh (e.g., of 0.5 mm stainless steel wire in a 15 mesh). The exemplary mesh is rolled into a generally frustoconical configuration and welded along a seam 144 (FIG. 3) to extend from a rim at an upstream end 146 of the element to a downstream end 148. Other forming techniques and other foraminate materials (e.g., perforated members, molded foraminate members, etc.) may be used. An upstream end portion of the foraminate member 142 is secured to a ring 150 captured within the sleeve upstream of the groove 88. In the exemplary embodiment, the ring 150 is formed of sheet metal (e.g., a stainless steel strip 14 mm wide and 1 mm thick) having an interior surface 152 and an exterior surface 154 and upstream and downstream ends or rims 156 and 158, respectively. The downstream rim 158 abuts an upstream-facing end of the rib 94 to prevent downstream movement of the ring and thus the strainer element. In the exemplary embodiment, the foraminate member 142 is secured to the ring such as by welding an exterior portion of the foraminate member adjacent the upstream end 146 to the interior surface 152 of the ring.

For installation of the strainer, the strainer may be inserted into the sleeve through the upstream end thereof until the ring 150 seats upstream of the groove 88. In this installed condition, the ring upstream end 156 and foraminate element downstream end 148 define respective upstream and downstream ends of the strainer 140. The length of the foraminate element downstream of the portion secured to the ring is advantageously chosen to provide sufficient straining surface area. In the exemplary embodiment, the downstream end 148 of the foraminate element is located longitudinally between the downstream groove 90 and sleeve downstream end 82. Advantageously, the downstream end 148 is located downstream of the upstream groove 88 and, more advantageously, downstream of a midpoint of the sleeve so as to provide a desired amount of surface area. Advantageously, the downstream end 148 remains upstream of the sleeve downstream end 82 so that the recessing of the strainer may protect the strainer from damage during assembly or disassembly of the inlet conduit assemblies.

For installation of the strainer/coupler, the sleeve is then placed between the adjacent conduits and the clamps are put in place and their bolts/nuts tightened to secure and seal the sleeve ends to the respective conduits. Disassembly for perodic cleaning of the strainer at a cleaning interval or replacement at a replacement interval or as may otherwise be required is by a reverse of this process.

Figure 5:
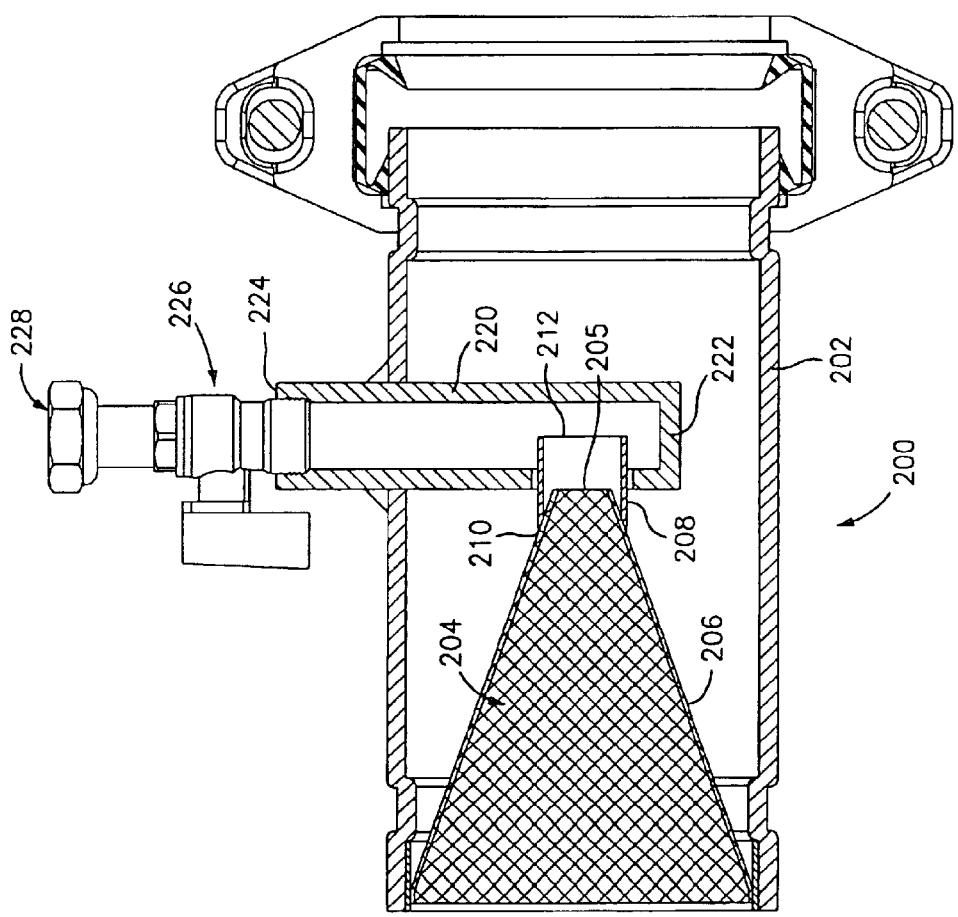
FIG. 5 is a partial longitudinal sectional view of an alternate strainer/coupler assembly.

FIG. 5 shows an alternate strainer/coupler assembly 200 having a sleeve 202 and a strainer 204 which, except as described below, may be similar to the sleeve 66 and strainer 140 of the strainer/coupler assembly 60. In the strainer 204, the downstream end 205 of the foraminate element 206 is open. In the exemplary embodiment, this open end is surrounded by a conduit 208 (e.g., a stainless steel tube with an upstream end 210 soldered to the exterior of the foraminate element and a downstream end 212 within a transverse conduit (e.g., a pipe) 220 extending through the sidewall of the sleeve 202. One end 222 of the pipe 220 within the sleeve is closed. The other end 224 is coupled to a valve 226 (e.g., a lever-actuated ball valve threaded into the pipe end). In normal operation, the valve 226 is closed blocking communication through the pipe 220 and, thereby, the downstream end of the strainer 204. The strainer operates as heretofore described. Periodically, however, the strainer may be flushed of solid contaminants by opening the valve 226 and, thereby permitting a flow from the interior of the strainer through the downstream end 205 and tube 212 into the pipe 220 and out an outlet 228 of the valve. This flushing flow may be maintained for an appropriate interval. Despite such flushing, periodically the strainer may still need to be replaced. Strainer replacement is eased by having a nonpermanent engagement between the strainer and the pipe 220.

In the exemplary embodiment, the tube 208 is closely fit within an aperture in the pipe sidewall with a clearance similar to or smaller than the mesh opening size of the strainer. This clearance advantageously permits easy removal of an old strainer and insertion of a new strainer without compromising filtration.

One or more embodiments of the present invention have been described. Nevertheless, it will be understood that various modifications may be made without departing from the spirit and scope of the invention. For example, details of any particular application may influence attributes of the strainer/coupler assemblies. Accordingly, other embodiments are within the scope of the following claims.

What is claimed is:

1. An apparatus comprising:
    a conduit having:
    a first end;
    interior and exterior surface extending downstream from the first end; and
    a clamping recess on the exterior surface and an associated projection on the interior surface opposite said clamping recess; and
    a strainer disposed inside said conduit having:
    a first end a second end;
    an upstream portion positioned to engage an upstream side of said projection to resist downstream shifting of the strainer;
    a strainer body at least partially downstream of the upstream portion; and
    a clamp engaged in said clamping recess for connecting said first end to an upstream fluid conducting member.

2. The apparatus of claim 1 wherein the conduit is a first conduit and the apparatus further comprises a second conduit extending trough a sidewall of the first conduit and having a first portion in fluid communication with a downstream portion of the strainer and a second portion coupled to a valve for selectively establishing communication between the strainer and a destination external to the first conduit.

3. The apparatus of claim 1 wherein the the clamping recess is a first clamping recess proximate the conduit first end and the conduit comprises a second clamping recess proximate the conduit second end.

4. The apparatus of claim 3 being a coupler for connecting first and second fluid conducting members and extending along an axis between said conduit first end and a conduit second end.

5. The apparatus of claim 1 wherein the conduit is formed of steel and wherein the clamping recess is a rolled groove.

6. An apparatus comprising:
    a metallic sleeve having:
    interior and exterior surfaces extending from a first end to a second end, a downstream direction being defined from said first end toward said second end;
    a first annular recess in the exterior surface and an axially aligned annular first rib in the interior surface opposite the first annular recess at a first location closer to the first end than to the second end; and
    a second annular recess in the exterior surface and an axially aligned annular second rib in the interior surface opposite the second annular recess at a second location closer to the second end than to the first end; and
    a strainer disposed inside said sleeve having:
    a first and a second end;

a first portion positioned to engage an upstream side of said first rib in the sleeve to resist downstream shifting of the strainer;

a strainer body at least partially on a downstream side of the first rib; and a first and second clamps each engaged in the first and second annular recesses, respectively, for connecting the first and second ends of the conduit to upstream and downstream fluid conducting members, respectively.

7. The apparatus of claim 6 wherein said strainer first portion is positioned between the first annular rib and the sleeve first end and having dimensions effective to engage the first rib to so resist downstream shifting of the strainer.

8. The apparatus of claim 6 where said first and second clamps, each radially inwardly directed upstream and downstream lips and a sealed body therebetween, the downstream lip of the first clamp being compressively engaged to the sleeve in the first recess and the upstream end of the second clamp being compressively engaged to the sleeve in the second recess.

9. The apparatus of claim 6 wherein the strainer body has a frustoconical sidewall extending from upstream of said first rib to said strainer second end.

10. The apparatus of claim 6 wherein:

the strainer first portion comprises a sheet metal sleeve; and the strainer body comprises a frustoconical sidewall secured to said sheet metal sleeve and extending downstream of said first rib to a radially-extending end portion at said strainer second end.

11. The apparatus of claim 6 wherein:

the strainer body consists essentially of a wire mesh.

12. The apparatus of claim 6 wherein the strainer second end is located downstream of a midpoint of the sleeve.

13. The apparatus of claim 6 wherein the strainer second end is located downstream of the second rib and upstream of the sleeve second end.

14. The apparatus of claim 6 wherein the sleeve is a first conduit and the apparatus further comprises a second conduit extending through a sidewall of the first conduit and having a first portion in fluid communication with a downs portion of the strainer and a second portion coupled to a valve for selectively establishing communication between the strainer and a destination external to the first conduit.

15. The apparatus of claim 6 wherein the sleeve is formed of steel.

16. The apparatus of claim 15 wherein the first and second annular recesses are each a rolled groove.

17. An apparatus comprising:

a metallic sleeve having:

interior and exterior surfaces extending from a first free end to a second free end, a downstream direction being defined from said first free end toward said second free end;

an annular recess in the exterior surface and an axially aligned annular first rib in the interior surface opposite the first annular recess at a first location closer to the first free end than to the second free end, wherein said first annular recess has a substantially rectangular cross section for engagement with a clamping member for fluidly connecting the first free end of said sleeve to a fluid conducting member;

a strainer disposed inside said sleeve having:

a first end and a second end;

a first portion positioned to engage an upstream side of said first rib in the sleeve to resist downstream shifting of the strainer; and a strainer body at least partially on a downstream side of the first rib.

* * * * *